(12) United States Patent
Ryan

(10) Patent No.: US 11,006,612 B2
(45) Date of Patent: May 18, 2021

(54) ADJUSTABLE VEHICLE PET PLATFORM ASSEMBLY AND METHOD OF USE

(71) Applicant: Scott Andrew Ryan, Fort Lauderdale, FL (US)

(72) Inventor: Scott Andrew Ryan, Fort Lauderdale, FL (US)

(*) Notice: Subject to any disclaimer, the term of this patent is extended or adjusted under 35 U.S.C. 154(b) by 132 days.

(21) Appl. No.: 16/044,241

(22) Filed: Jul. 24, 2018

(65) Prior Publication Data

US 2019/0029217 A1 Jan. 31, 2019

Related U.S. Application Data

(60) Provisional application No. 62/536,710, filed on Jul. 25, 2017.

(51) Int. Cl.
*A01K 1/02* (2006.01)
*A01K 1/035* (2006.01)
*B60N 3/00* (2006.01)

(52) U.S. Cl.
CPC .......... *A01K 1/0353* (2013.01); *A01K 1/0272* (2013.01); *B60N 3/001* (2013.01)

(58) Field of Classification Search
CPC ....... A01K 1/0272; B60N 2/28; B60N 2/2821
See application file for complete search history.

(56) References Cited

U.S. PATENT DOCUMENTS

| 1,363,667 A | 12/1920 | Mahr |
| 2,869,146 A | 1/1958 | Allison |
| 4,512,286 A | 4/1985 | Rux |
| 4,597,359 A | 7/1986 | Moorman |
| 4,943,105 A | 7/1990 | Kacar et al. |
| 5,123,377 A | 6/1992 | Edwards |
| 6,564,750 B1 | 5/2003 | Collins |
| 6,591,787 B1 | 7/2003 | Gantz et al. |
| 7,735,456 B2 | 6/2010 | Wiley |
| 8,091,513 B1 * | 1/2012 | Garcia ................. A01K 1/0272 119/28.5 |
| 8,893,661 B2 * | 11/2014 | Pietra ..................... F16M 13/02 119/28.5 |
| RE47,524 E * | 7/2019 | Pietra ................... A01K 1/0272 |
| 2004/0078895 A1 * | 4/2004 | Eiling .................... A47D 7/002 5/95 |

(Continued)

FOREIGN PATENT DOCUMENTS

| EP | 3387900 A1 * | 10/2018 | ........... A01K 1/0272 |
| WO | WO-2012172001 A1 * | 12/2012 | ........... B60N 2/2821 |
| WO | WO-2019236460 A1 * | 12/2019 | ............... B60N 2/28 |

*Primary Examiner* — Kristen C Hayes
(74) *Attorney, Agent, or Firm* — Mark C. Johnson; Johnson Dalal

(57) ABSTRACT

An adjustable vehicle pet platform assembly and method of use prevents inadvertent or intentional activation of an air bag sensor incorporated in a seat portion of a vehicle seat by supporting the pet on a platform body. The platform body extends and retracts longitudinally to accommodate variously sized pets. The platform body is suspended in a spaced-apart disposition from the seat portion. A length and angle-adjustable front leg support elevates the platform body above the seat portion from the floor surface of vehicle. An angle-adjustable rear leg support supports the platform body from the rear portion of the seat.

19 Claims, 8 Drawing Sheets

(56) References Cited

U.S. PATENT DOCUMENTS

| | | | |
|---|---|---|---|
| 2007/0069562 A1* | 3/2007 | Van Montfort | B60N 2/2893 |
| | | | 297/253 |
| 2007/0084411 A1 | 4/2007 | Bennett | |
| 2007/0157891 A1 | 7/2007 | Wayn | |
| 2008/0184937 A1 | 8/2008 | Hoffman et al. | |
| 2008/0303321 A1* | 12/2008 | Powell | B60N 2/2845 |
| | | | 297/216.11 |
| 2011/0309658 A1* | 12/2011 | Carimati Di Carimate | |
| | | | B62B 9/24 |
| | | | 297/68 |
| 2016/0200225 A1* | 7/2016 | Van Der Veer | B60N 2/2884 |
| | | | 297/256.16 |

* cited by examiner

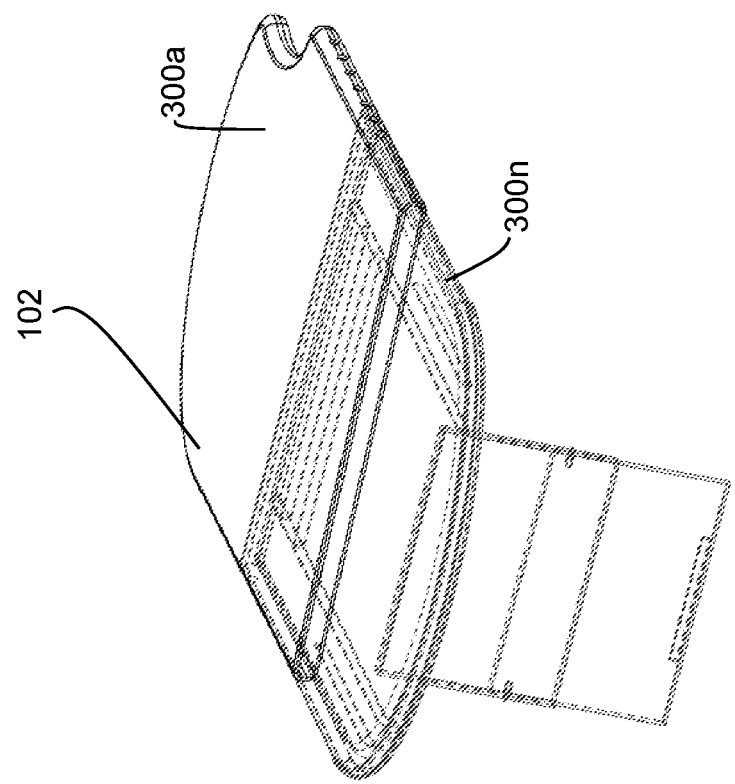
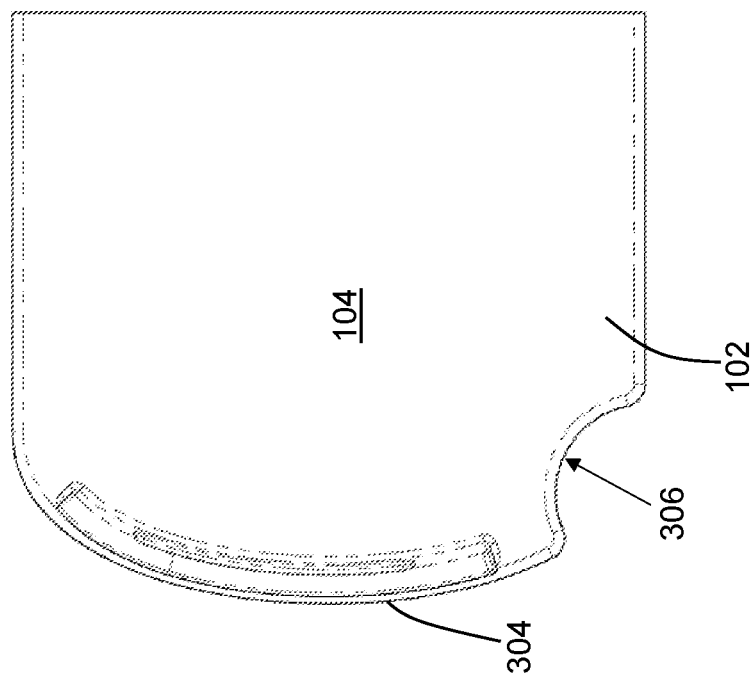

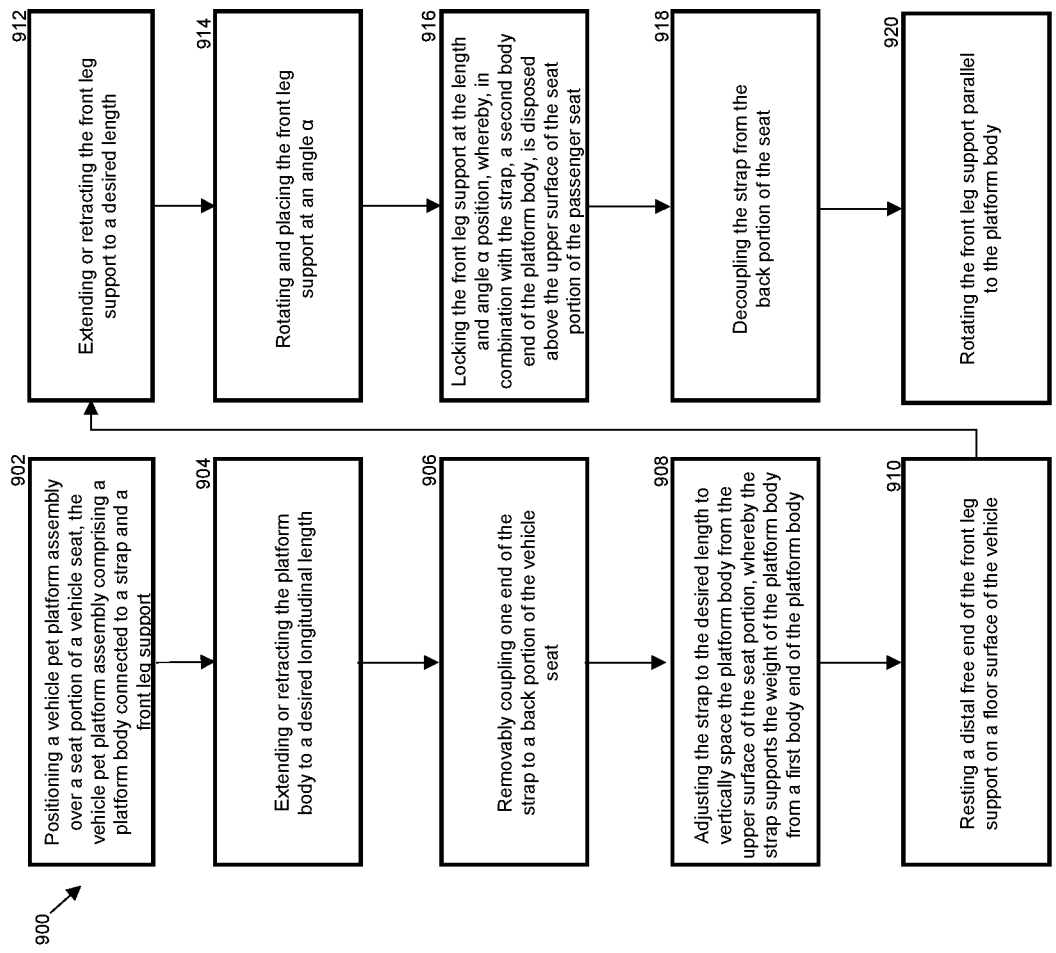

ADJUSTABLE VEHICLE PET PLATFORM ASSEMBLY AND METHOD OF USE

CROSS-REFERENCE TO RELATED APPLICATION

This application claims priority to U.S. Provisional Patent Application No. 62/536,710 filed Jul. 25, 2017, the entirety of which is incorporated by reference.

FIELD OF THE INVENTION

The present invention relates generally to an adjustable vehicle pet platform assembly and method of use, and, more particularly, relates to a pet platform that prevents inadvertent or intentional activation of an air bag sensor incorporated in a seat portion of a vehicle passenger seat by supporting the pet on a platform body that is supported above the seat portion through use of a length-adjustable strap that supports the platform from the back portion of the seat portion and helps restrain the pet on the platform body; and a length and angle-adjustable front leg support that elevates the platform body above the seat portion from the floor surface of the vehicle.

BACKGROUND OF THE INVENTION

Typically, an airbag is a type of vehicle safety device that works as an occupant restraint system during impact or sudden stops. The airbag is designed to inflate extremely rapidly then quickly deflate during a collision or impact with a surface or a rapid sudden deceleration. It consists of an airbag cushion, a flexible fabric bag, inflation module, and impact sensor. The impact sensor is often integrated into a passenger seat of a vehicle. Generally, the impact sensor is a flexible laminate mat with printed resistors and cylindrical force concentrators. Force concentrators are bonded to the sensor mat over the printed resistors. When the surface of the seat is depressed, the sensor mat and printed resistors will wrap around the force concentrators, which creates a change in the circuit resistance. Based upon the pattern and the weight of the depression, the impact sensor can determine whether or not to deploy the passenger side air bag in a crash situation.

Often, a seat weight sensor is employed to determine if the occupant in the seat is large enough for safe air bag deployment. A circuit for actuating respective air cushions for the driver and passengers of a vehicle in the event of a collision includes relay contacts connected in the series network for firing the squib which controls inflation of the passenger cushion. When the seat is occupied by a passenger, the seat sensor disables the relay controlling the contact and the series network is armed. If no passenger occupies the seat the relay is energized to open circuit the series network and prevent inflation of the passenger cushion in the event of a collision. However, it is often not desirable to employ the air bag, such as when an inanimate object or a moving animal occupies the seat.

Often, pet owners transport their pets in their vehicles. The weight of the pet, especially larger pets, can trigger the air bag sensor or seatbelt alert system. Furthermore, animal transportation often places both the driver and pet in a potentially risky situation. If the driver is forced to make a sudden maneuver the pet may be thrown, thus causing injury to the pet and possibly to the driver as well. Also, a pet freely roaming about a vehicle may distract a driver, thus creating a dangerous situation. Further, pets placed in the seat of a vehicle can be thrown out of the seat upon impact or sudden stops if not secured to the vehicle seat properly. Or in some cases, the pets may damage the seat and interior of the vehicle if they are too overactive.

The present invention features a vehicle pet platform assembly that elevates the pet over the passenger seat for helping to keep the pet secure and safe in the seat. The assembly can also help protect the vehicle's seats and interior from damage caused by an overactive pet. The assembly is easy to install and remove, and the assembly is also easy to clean.

Therefore, a need exists to overcome the problems with the prior art as discussed above.

SUMMARY OF THE INVENTION

The invention provides an adjustable vehicle pet platform assembly and method of use that overcomes the hereinafore-mentioned disadvantages of the heretofore-known devices and methods of this general type and prevents inadvertent or intentional activation of an air bag sensor incorporated in a seat portion of a vehicle passenger seat by supporting the pet on a platform body above the seat portion of the passenger seat. The platform body extends and retracts longitudinally to accommodate variously sized pets. The platform body is suspended in a spaced-apart disposition from the seat portion. A length-adjustable strap couples to the back portion of the seat and hingedly couples to the platform body. The strap supports the platform body from the front portion of the passenger seat and helps retain the pet on the platform body. A length and angle-adjustable front leg support elevates the platform body above the seat portion from the floor surface of the vehicle. An angle-adjustable rear leg support supports the platform body from the rear portion of the passenger seat. A non-slip padding overlays the upper surface of the platform body to provide additional comfort to the pet.

With the foregoing and other objects in view, there is provided, in accordance with the invention, a vehicle pet platform assembly comprising a platform body having an upper surface, a lower surface opposing the upper surface, a first body end, and a second body end that opposes the first body end. In some embodiments, a strap wraps around a back portion of the passenger seat and couples proximally to the first body end of the platform body.

In some embodiments, a front leg support rotatably couples to the lower surface of the platform body. The front leg support has a distal free end with a lower support surface. The front leg support is defined by a plurality of leg support sections telescopically coupled together. In yet another embodiment, a rear leg support couples proximally to, i.e., at or near, the first body end of the platform body.

In some embodiments, a platform installation position forms along a platform installation path. The platform installation position is configured to retain the assembly suspended over the passenger seat, while supporting the pet. The platform installation position may include: the strap removably coupled to and surrounding a back portion of a passenger seat of a vehicle; the lower support surface of the distal free end directly coupled to a floor surface of the vehicle, and the entirety of the lower and upper surfaces of the platform body disposed above an upper surface of a seat portion of the passenger seat of the vehicle.

In accordance with another feature, an embodiment of the present invention, the platform body further comprises a plurality of body sections telescopically coupled together, each of the plurality of body sections defining the upper surface of the platform body.

In accordance with another feature, the plurality of body sections are operably configured to lockably couple with one another.

In accordance with another feature, the plurality of body sections include either one or more ball-member(s) and one or more corresponding detent(s) shaped and sized to receive the at least one ball-member.

In accordance with another feature, the platform body further comprises: a perimeter defining an arcuate chamfer disposed proximal to the first body end, the arcuate chamfer shaped and sized to receive a seat belt therein.

In accordance with another feature, the upper surface of the platform body is substantially planar.

In accordance with another feature, the platform body further comprises a plurality of body sections telescopically coupled together, each of the plurality of body sections defining the upper surface of the platform body.

In accordance with another feature, the platform body further comprises a perimeter defining an arcuate chamfer disposed proximal to the first body end, the arcuate chamfer shaped and sized to receive a seat belt therein.

In accordance with another feature, the perimeter comprises an oval-shaped plastic frame.

In accordance with another feature, the upper surface of the platform body is substantially planar. f In accordance with another feature, the upper surface of the platform body further comprises a non-slip padding.

In accordance with another feature, the strap is length adjustable.

In accordance with another feature, the strap is hingedly coupled to the to the first body end of the platform body.

In accordance with another feature, the strap comprises a nylon material.

In accordance with another feature, the front leg support comprises a flat panel.

In accordance with another feature, the front leg support further comprises a first hinge disposed between a proximal end of the front leg support and the lower surface of the platform body.

In accordance with another feature, the plurality of front leg support sections are defined by a slidable relationship.

In accordance with another feature, the plurality of front leg support sections comprises two sections.

In accordance with another feature, the rear leg support further comprises a second hinge disposed between the rear leg support and the platform body, the hinge enabling the rear leg support to rotate at an angular movement range between 0° and 90° relative to the platform body.

One objective of the present invention is to provide a stable, portable platform body for a pet from the passenger seat of a vehicle.

Another objective is to suspend the platform body over the seat portion of the passenger seat of the vehicle, so as to prevent inadvertent or intentional activation of an air bag sensor incorporated in a seat portion of a vehicle passenger.

Another objective is to provide padding on the platform body for the comfort of the pet.

Another objective is to protect the passenger seat from damage by the claws of the pet by elevating the pet above the passenger seat.

Yet another objective is to form an arcuate chamfer in the body portion to enable space for a seat belt to retain the platform body in place.

Yet another objective is to provide a strap that is length adjustable to raise and lower the platform body to accommodate variously sized pets.

Yet another objective is to provide a strap that wraps around the midsection of the pet to help restrain the pet on the platform body.

Yet another objective is to provide an arcuate chamfer that receives a seatbelt for securing the midsection of the pet against the back portion of the passenger seat and the platform body.

Yet another objective is to provide an additional rear leg support that supports the first body end of the platform body, along with the front leg support.

Yet another objective is to provide a plurality of body sections for the platform body that extends and retracts to accommodate variously sized pets.

Yet another objective is to provide a two body sections that lockably couple together.

Yet another objective is to enable the rear leg support and front leg support to rotate parallel with the platform body for compact stowage.

Yet another objective is to provide a vehicle pet platform assembly that is easy to disassemble for cleaning.

Yet another objective is to provide an inexpensive to manufacture vehicle pet platform assembly.

Although the invention is illustrated and described herein as embodied in a Vehicle Pet Platform Assembly and Method of Use, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the pet platform body.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 4A and 4B are views of a platform body, where FIG. 4A is a top view showing an exemplary arcuate chamfer, and FIG. 4B is a sectioned view showing a ball and detent slidable relationship between two body sections, in accordance with an embodiment of the present invention;

FIG. 9 is a flowchart for a method of using a vehicle pet platform assembly, in accordance with an embodiment of the present invention.

DETAILED DESCRIPTION

Figure 1:
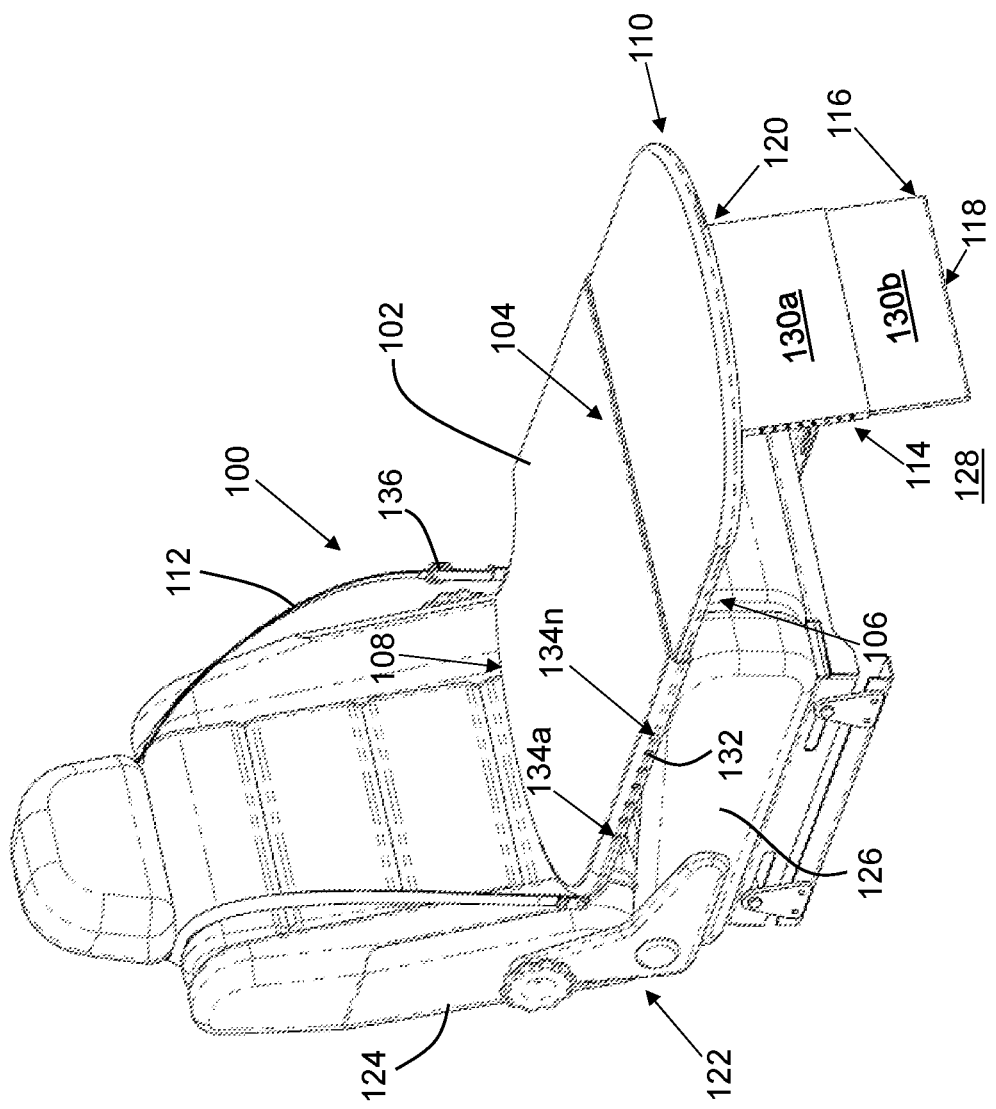
FIG. 1 is a perspective view of an exemplary vehicle pet platform assembly operational with a vehicle passenger seat, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient vehicle pet platform assembly 100 and method 900 of use. Embodiments of the invention provide a vehicle pet platform assembly 100 that supports a pet in a suspended, restrained position on a platform body 102 above a seat portion 126 of a passenger seat 122 in a vehicle in such a manner that the weight or motion of the pet does not trigger the airbag sensors or seatbelt alerting system integrated in the seat portion 126 of the passenger seat 122.

In some embodiments, the vehicle pet platform assembly 100 provides a platform body 102 that is operable with a passenger seat 122 of a vehicle. Further, a length adjustable strap 112 detachably couples to the back portion 124 of the passenger seat 122 to support a first body end 108 of the platform body 102 above the seat portion 126 of the passenger seat 122, while also restraining the pet on the platform body 102. Further, a hinged, length and angle-adjustable front leg support 114 extends from a floor surface 128 to the front of the platform body 102 to support the platform body 102 above the seat portion 126.

Thus, the strap 112 and front leg support 114 suspend the platform body 102 above the seat portion 126 of the passenger seat 122, such that a space forms between the seat portion 126 and the platform body 102. The strap 112 and the front leg support 114 provide two opposing support points for the platform body 102, which beneficially increases the structural and integrity of the platform body 102 when in use. This helps to prevent triggering the airbag and seatbelt alerts systems that are integrated in the seat portion. Further, a non-slip padding overlays the upper surface 104 of the platform body 102 to provide additional comfort to the pet.

In other embodiments, the platform body 102 has multiple body sections 300a-n that are longitudinally length adjustable to provide adjustment for a desired length of an animal on the platform body 102. In additional embodiments, a rear leg support 800 may be used as a sole or additional support to the platform body 102 to accommodate/support one or more pet(s). In one embodiment, the rear leg support 800 may be hinged and/or may continually or discontinually extend or span along the first body end 108 of the platform body 102. The rear leg support is disposed proximal to the first body end 108 as shown in the figures. In preferred embodiments, the rear leg support is disposed at the terminal end of platform body 102. The rear leg support 800, when the platform is in the platform installation position along a platform installation path, is disposed in a crevice or joint between the back portion 124 and seat portion 126 of the passenger seat 122, thereby sidestepping any air bag sensor disposed on or within the seat 126.

In some embodiments, the pet may include, without limitation, a dog, a cat, a hamster, a lizard, a farm livestock, a bird, and a fish inside a fish bowl. The vehicle may include, without limitation, an automobile, a van, a truck, a boat, an airplane, a train, and a rollercoaster. The passenger seat 122 may include the front or rear seats of the vehicle; and especially the front passenger-side seat. The back portion 124 of the passenger seat 122 is the portion of the seat that is operably configured to support a user's back/head. The seat portion 126 of the passenger seat 122 is the portion of the seat operably configured to support a user's lower extremities, such as the buttocks. However, the present invention, pets, and seat components described herein are not limited to these limitations.

Referring now to FIG. 1, one embodiment of the present invention is shown in a perspective downward-looking side view. FIG. 1 shows several advantageous features of the present invention, but, as will be described below, the invention can be provided in several shapes, sizes, combinations of features and components, and varying numbers and functions of the components.

The first example of a vehicle pet platform assembly 100, as shown in FIG. 1, includes a platform body 102. The platform body 102 forms the primary surface on which the pet sits, moves, and rests. The platform body 102 is defined by an upper surface 104, and an opposing lower surface 106. The entirety of the upper and lower surfaces 104, 106 of the platform body 102 are disposed above a top surface of the seat portion 126 of the passenger seat 122. As such, users may transport pets and/or other items without triggering an airbag sensor or seatbelt alert system that is imbedded within the seat portion 126.

The lower surface 106 of the platform body 102 is oriented to face the seat portion 126 of the passenger seat 122. The upper surface 104 is oppositely disposed, forming the surface on which the pet rests. The upper surface 104 of the platform body 102 may be fabricated from a soft material, such as cotton, to effectuate a comfortable environment for the pet to lie down, stand, or otherwise rest on. In one non-limiting embodiment, a non-slip padding 302 may be placed on the upper surface 104 of the platform body 102. Use of such padding 302 provides additional comfort for the pet.

Figure 2:
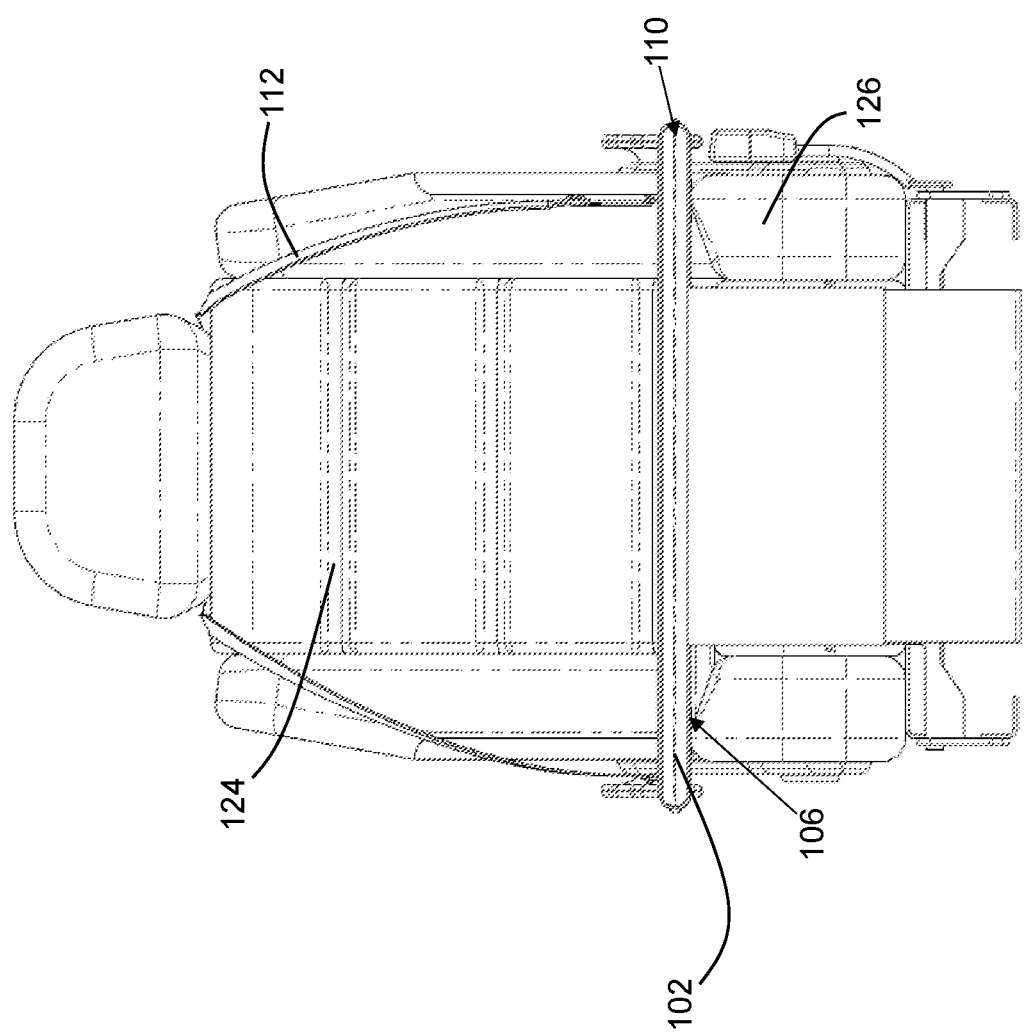
FIG. 2 is a front view of the vehicle pet platform assembly disposed in a platform installation position on a vehicle passenger seat, in accordance with an embodiment of the present invention.

Turning now to FIG. 2, when the assembly 100 is assembled in a platform installation position, the platform body 102 is disposed generally parallel with the seat portion 126; and generally orthogonal to the back portion 124 of the passenger seat 122. This orientation supports the pet in an upright position, as if sitting on the passenger seat 122. In some embodiments, the platform body 102 may have a generally oval shape. Though in other embodiments, the platform body 102 may have other shapes, including rectangular, square, and irregular shapes.

The platform body 102 is further defined by a first body end 108 (which may be the terminal end), and a second body end 110 (which may also be the terminal end) opposing the first body end 108. In one embodiment, the first body end 108 is disposed proximal to a back portion 124 of the passenger seat 122. In another embodiment, the first body end 108 engages the back portion 124 of the passenger seat 122.

Figure 3:
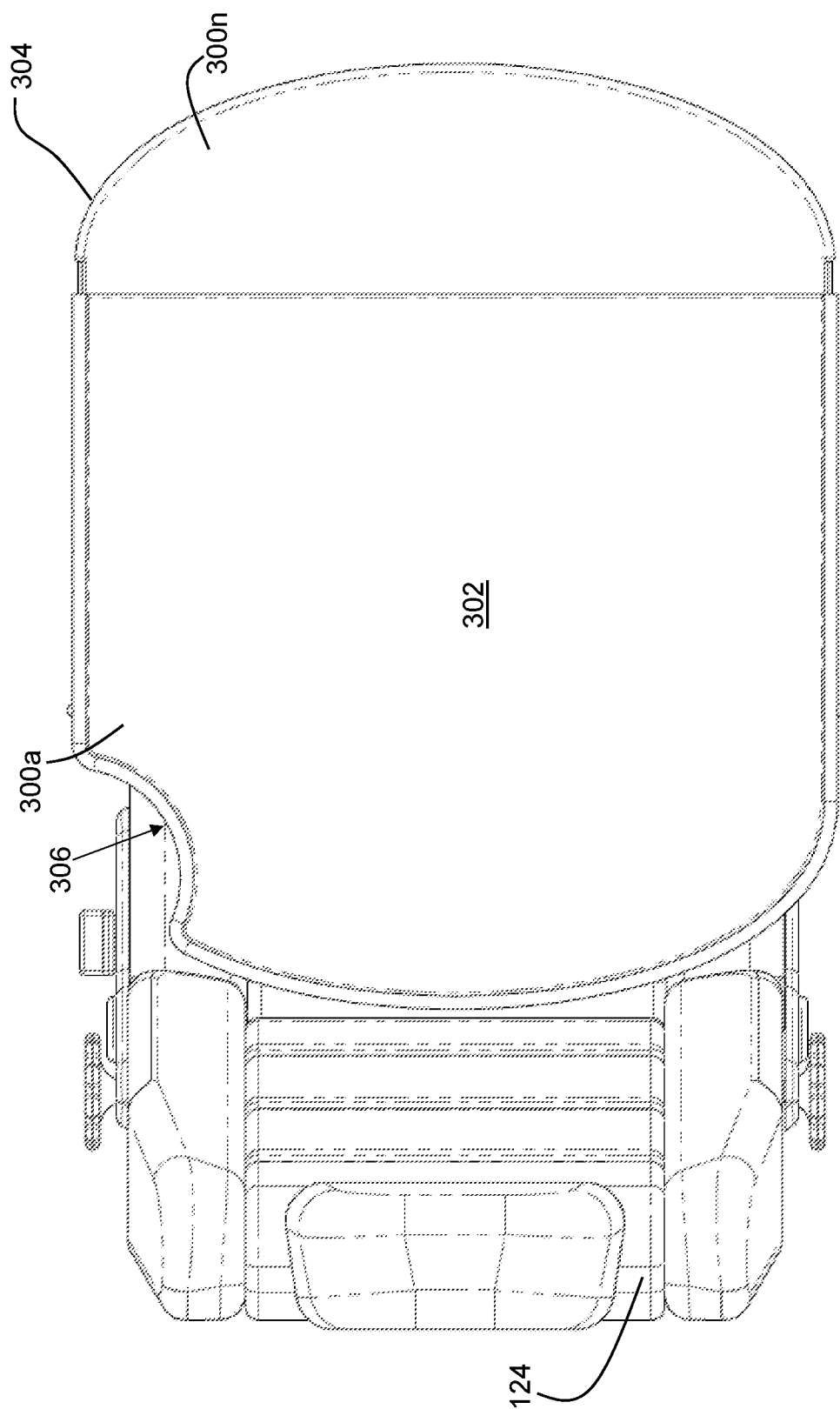
FIG. 3 is a top plan view of a platform body from the vehicle pet platform assembly, in accordance with an embodiment of the present invention.

As referenced in FIG. 3, the platform body 102 comprises a plurality of body sections 300a-n. The body sections 300a-n may expand and retract to define various positions along a platform expansion path (which may be linear in nature). As such, the platform body 102 may have elastic properties. Though, rigidly constructed body sections 300a-n follow substantially the same platform expansion path. In one non-limiting embodiment, the platform body 102 has an exemplary longitudinal length range of 2-5 feet. The platform body 102 length beneficially accommodates pets and vehicle seat dimensions of various sizes and/or shapes.

In some embodiments, the platform body 102 further comprises a perimeter 304 that forms a rigid or semi-rigid peripheral area that circumvents the first and second body ends 108, 110. In one non-limiting embodiment, the perimeter 304 comprises an oval-shaped plastic frame that follows the generally oval shape of the platform body 102. Though the perimeter 304 may have other shapes, including a square, rectangular, circular, or irregular shape.

As FIGS. 3 and 4A illustrate, the perimeter 304 may be defined by an arcuate chamfer 306 that is disposed proximal to the first body end 108. The arcuate chamfer 306 is shaped and sized to receive a seat belt therein. The seat belt fits into the space of the arcuate chamfer 306 to traverse the platform body 102, and wrap around the midsection of the pet. The capacity of the platform body 102 to receive a seat belt though use of an arcuate chamfer 306 provides yet another fastening means to restrain the pet on the platform body 102.

Looking again at FIG. 3, the platform body 102 is further defined by a plurality of body sections 300a-n, wherein "n" represents any number greater than 1. The body sections 300a-n may be telescopically coupled together to telescopically or slidably extend and retract to beneficially accommodate pets of different sizes and shapes. For example, the body sections 300a-n may utilize an aperture/retractable-nodule configuration that enables selective longitudinal sizing of the platform body 102. Thus, the platform body 102 can be longitudinally extended and retracted to increase and decrease size. This size-adjustable feature of the platform body 102 can be advantageous for supporting variously sized and dimensioned pets.

With reference to FIGS. 1-4A-B, the body sections 300a-n are coupled together through use of a spring-loaded ball-member 132 and plurality of apertures 134a-n, forming a detent assembly. The ball-member 132 is spring loaded and slides within one of the body sections, against the pressure of a spring, which pushes the ball-member 132 against an adjacent body section that forms the plurality of apertures 134a-n. Said another way, one or both sides of a body section include a spring-loaded ball operably configured to translate back-and-forth and engage with an opposing body section and be received within a detent defined on said opposing body section, i.e., said detent is shaped and sized to be receive said ball-member. When the ball member 132 is in line with the aperture, the ball member 132 falls partially into the aperture under spring pressure, holding the two body sections 300a, 300n at that position. Applying additional force to the ball member 132 pushes it back into its body section, compressing the spring, and allowing the ball member 132 to move to another aperture or detent. However, in other embodiments, the body sections 300a-n may be frictionally and translatably coupled together.

Though length adjustment of the strap, and longitudinal sizing of the platform body 102, both vertical and longitudinal expansion are possible for the platform body 102, allowing it to fit within most vehicles and be raised (specifically, all or most of the body sections of the platform) beneficially above the upper surface 104 of the seat. As such, users may transport pets and/or other items without triggering any passenger seat 122 airbag sensors imbedded within said seat.

In certain embodiments, the body sections of the platform body 102 may be of multiple layers, including a rigid frame (e.g., of a metallic or polymeric material), a deformably resilient layer (e.g., of natural rubber or memory foam), and an upper layer of a soft and/or non-slip material (e.g., nylon/cotton/synthetic), whereby one or more of the layers may be removable for cleaning and/or efficient disassembly 100. The platform body 102 may also be lightweight, washable, and have an odor-resistant composition integrated therein.

Turning back to FIG. 2, the assembly 100 may also include a strap 112 that provides a dual purpose mechanism that suspends the platform body 102 above the seat portion 126 of the passenger seat 122, and restrains the pet on the platform body 102. The strap 112 elevates the platform body 102 above the seat portion 126 of the passenger seat 122. In some embodiments, the strap 112 may be configured to wrap around the back portion 124 of the passenger seat 122 from one end, and hingedly couple to one of the body sections 300a-n of the platform body 102 from an opposite end.

The strap 112 may be looped, and simply wrap around a headrest, for example (FIG. 2). The opposite end of the strap 112 rotatably couples to the first body end 108 of the platform body 102 about a strap hinge (shown best in FIG. 1). In addition to supporting the platform body 102, the strap 112 also wraps around the midsection of the pet, passing between the forearms for some pets. In this manner, the strap 112 helps restrain the pet to the platform body 102, and against the back portion 124 of the passenger seat 122.

Figure 5:
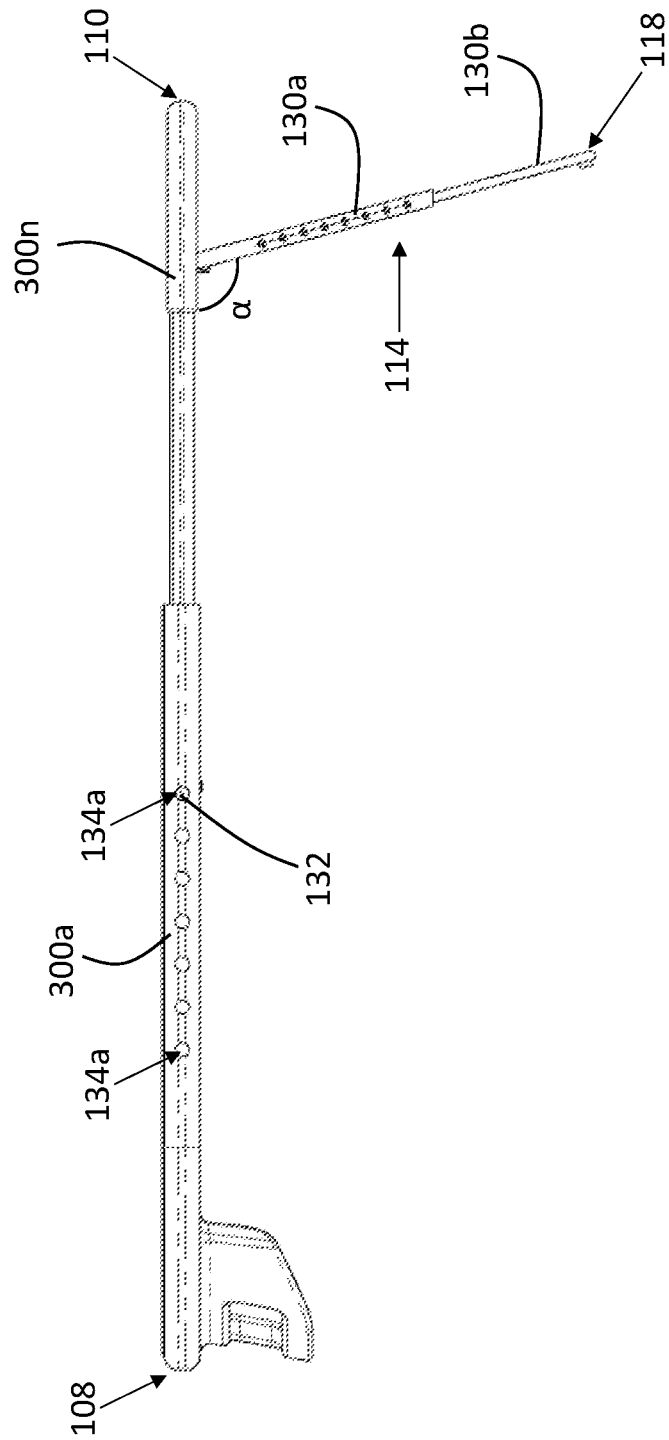
FIG. 5 is a side elevational view of a vehicle pet platform assembly, showing an exemplary front leg support extended out to angle α, in accordance with an embodiment of the present invention.

Referring to FIGS. 1-2 and 5, the strap 112 is length adjustable. This length-adjustability accommodates variously sized and dimensioned pets. A buckle to increase or decrease the length of the strap 112. In other embodiments, the strap 112 may have an adjustable circumference through use of a clasp 136 and/or may be elastic. In one embodiment, the platform body 102 may be raised approximately 12 inches (although other lengths are possible) above the seat portion 126. Suitable materials for the strap 112 may include, without limitation, a fabric material, such as nylon or cotton. Though the strap 112 may be fabricated from any resilient material known in the art.

In addition to, or instead of the strap 112, a front leg support 114 (best shown in FIG. 7) may be employed to support the platform body 102 from the second body end 110 of the platform body 102. The front leg support 114 is defined by a proximal end 120 and a distal free end 116 having a lower support surface 118. The proximal end 120 hingedly attaches to the first body end 108 of the platform body 102, so as to be rotatably coupled to the lower surface 106 of the platform body 102. In some embodiments, the front leg support 114 may include a first hinge 600 disposed between the proximal end 120 and the lower surface 106 of the platform body 102. The first hinge 600 enables this rotatable articulation of the front leg support 114 about the platform body 102.

Similar to the configuration of the body sections, the front leg support 114 may have a plurality of leg support sections 130a, 130b telescopically coupled and lockable together to beneficially accommodate various seats and/or other vehicle dimensions. The leg support sections 130a, 130b also slide into each other to adjust the length of the front leg support 114. In one non-limiting embodiment, two leg support sections 130a, 130b slidably engage to increase and decrease the length of the front leg support 114.

Figure 6:
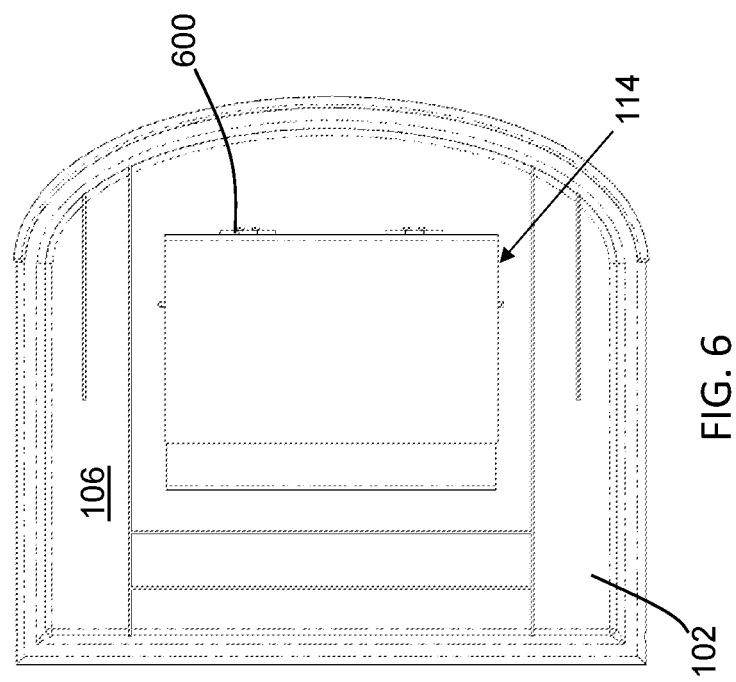
FIG. 6 is a bottom view of a platform body, showing the front leg support folded parallel to the platform body, in accordance with an embodiment of the present invention.

As shown in FIG. 6, the front leg support 114 is collapsible to the platform body 102 for stowage by folding about the first hinge 600 until in parallel to the platform body 102, and sliding the leg support sections 130a, 130b into each other. This collapsed position of the front leg support 114 facilitates storage of the assembly 100.

Figure 7:
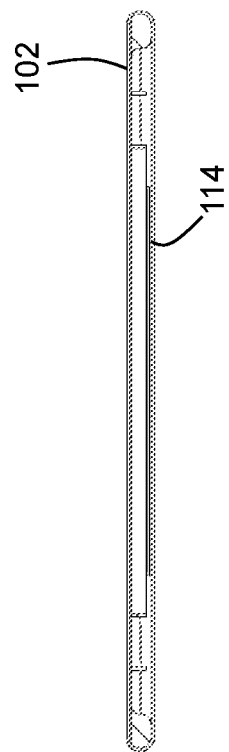
FIG. 7 is a sectioned side view of a platform body, in accordance with an embodiment of the present invention.

In the platform installation position (shown best in FIGS. 1-2), though, the front leg support 114 may be operably configured to be disposed and/or locked at a substantially orthogonal orientation with respect to the platform body 102. The front leg support 114 may be operably configured to be disposed and/or locked at a substantially parallel and non-co-planar orientation with respect to the platform body 102 (FIG. 7). This operational position supports the platform body 102 above the surface of the seat portion 126. Thus, the front leg support 114 is both operational as a length and angle adjustable leg, and easily compacted parallel and flush with the platform body 102 through an easy folding motion.

Said another way, the front leg support 114 may be operably configured to have angular movement range α, of approximately 120° with respect to the lower surface 106 of the platform body 102. Similar to the configuration of the body sections 300a-n in the platform body 102, the front leg support 114 may have a plurality of leg support sections 130a, 130b telescopically coupled and lockable together to beneficially accommodate various seats and/or other vehicle dimensions. As seen best in FIGS. 1 and 5, the front leg support 114 includes a distal free end 116, opposing the hinged proximal end 120. The distal free end 116 is "free" in that it is structurally unattached to another object and freely permitted to move. In some embodiments, the proximal end 120 and the distal free end 116 are panels that slide into each other.

Figure 8:
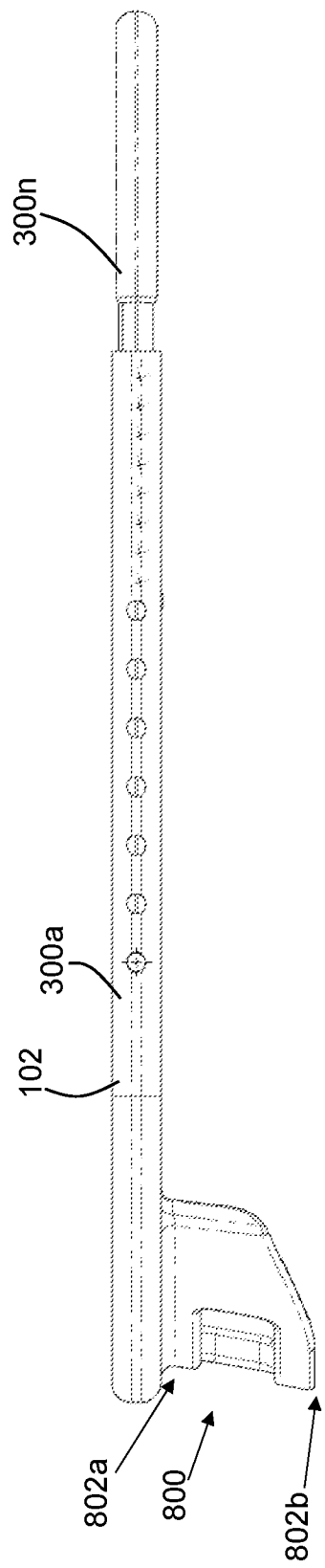
FIG. 8 is a side elevational view of a vehicle pet platform assembly in accordance with an embodiment of the present invention.

In addition to, or instead of the strap 112 and the front leg support 114, a rear leg support 800 may be used to support the platform body 102 from the first body end 108 of the platform body 102, as shown in FIG. 8. The rear leg support 800 comprises a rear distal free end 802b and a rear proximal end 802a. The rear leg support 800 may be rotatable about the rear proximal end 802a. In one non-limiting embodiment, the rear leg support 800 may include a second hinge (not shown) that is disposed between the rear proximal end 802a and the first body end 108 of the platform body 102. The hinge may enable the rear leg support 800 to rotate at an angular movement range between 0° and 90° relative to the platform body 102. In other embodiments, the rear leg support 800 is fixed to the body 102. However, the rotatable articulation of the rear leg support also allows the rear leg support 800 to fold parallel to the platform body 102 for stowage, similar to the front leg support 114.

When in an installed position, the rear distal free end 802b is disposed at a crevice interposed between the back portion 124 and seat portion 126 of the passenger seat 122. The rear distal free end 802b is sized and dimensioned to fit snugly into the crevice. When engaged into the crevice in this manner, the rear leg support 800 does not slide from its supportive position, supporting the platform body 102 parallel to the seat portion 126.

Looking again at FIGS. 1 and 2, the assembly 100 forms a platform installation position along a platform installation path when operational with the passenger seat 122. The platform installation position includes the strap 112 removably coupled to a back portion 124 of a passenger seat 122 of a vehicle. The back portion 124 is the portion of the seat that is operably configured to support a user's back/head. The strap 112 may be of a fabric material, such as nylon or cotton, and may have an adjustable circumference through use of a clasp 136 and/or may be elastic.

The platform installation position also includes the front leg support 114 free resting on a passenger side floor surface 128 of the vehicle, thereby facilitating, in combination with the strap 112, a position of the platform body 102, specifically the lower surface 106 of the plurality of body sections 300a-n, disposed above an upper surface 104 of the seat portion 126 of the passenger seat 122. As discussed above, the seat portion 126 of the passenger seat 122 is the portion of the seat operably configured to support a user's lower extremities.

As the platform body 102 beneficially provides vertical and longitudinal expansion, the platform body 102 can fit within most vehicles and be raised (specifically, all or most of the body sections of the platform) beneficially above the upper surface of the seat portion 126, e.g., up to, or above in certain embodiments, approximately 12 inches (although other lengths are possible). As such, users may transport pets and/or other items without triggering any passenger seat 122 airbag sensors and seatbelt alert systems that are imbedded within the passenger seat 122.

As those of skill in the art will appreciate, to install the platform body 102, the user may adjust the strap 112 to the desired length vertically spacing the platform from the upper surface 104 of the seat. The strap 112 supports the weight of the platform (and pet) substantially from the first body end 108 of the platform. Next, the user may extend or retract the platform body 102 to a desired longitudinal length. After, the user may rotate and place the front leg support 114 member at the desired angle α, and extend the front leg support 114 so that the distal free end 116 is resting on a floor surface 128 of the vehicle, thereby supporting the platform body 102 from the second body end 110 of the platform body 102. Said another way, the assembly 100 provides at least two opposing support points for the platform body 102, which beneficially increases the structural and integrity of the platform body 102 when in use.

To uninstall the assembly 100 from the passenger seat 122, the user removes the strap 112 from the seat. To place the assembly 100 in a transporting position, the user may then rotate and/or lock the front leg support 114 to the shortest length possible. The front leg support 114 may be locked using a fastener and/or a friction fitting. Although a specific order of process steps has been disclosed above, the order of executing the steps may be changed relative to the order shown in certain embodiments. Moreover, certain steps may also be omitted for the sake of brevity. In some embodiments, some or all of the process steps can be combined into a single process.

FIG. 9 will be described in conjunction with the process flow chart of FIG. 9. Although FIG. 9 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 9 for the sake of brevity. In some embodiments, some or all of the process steps included in FIG. 9 can be combined into a single process.

FIG. 9 illustrates a flowchart diagram of an exemplary method 900 for use of an adjustable vehicle pet platform assembly 100. The method 900 may include an initial Step 902 of positioning a vehicle pet platform assembly 100 over a seat portion of a vehicle seat, the vehicle pet platform assembly 100 comprising a platform body connected to a strap and a front leg support. The adjustable vehicle pet platform assembly 100 prevents inadvertent or intentional activation of an air bag sensor or seatbelt alarm system incorporated in a seat portion 126 of a vehicle passenger seat by supporting the pet on the platform body 102.

In some embodiments, the method 900 may further comprise a Step 904 of extending or retracting the platform body to a desired longitudinal length. The platform body 102 is further defined by a plurality of body sections 300a-n that are telescopically coupled together for telescopically or slidably extending and retracting to beneficially accommodate pets of different sizes and shapes. A Step 906 includes removably coupling one end of the strap to a back portion of the vehicle seat. The strap 112 may be looped, and simply wrap around a headrest, for example (FIG. 2).

In some embodiments, a Step 908 comprises adjusting the strap to the desired length to vertically space the platform body from the upper surface of the seat portion, whereby the strap supports the weight of the platform body substantially from a first body end of the platform body. A clasp 136 or buckle can be used to length adjust the strap 112.

A Step 910 includes resting a distal free end of the front leg support on a floor surface of the vehicle. In some embodiments, a Step 912 may include extending or retracting the front leg support to a desired length. A Step 914 comprises rotating and placing the front leg support at an angle α. A Step 916 includes locking the front leg support at the length and angle α position, whereby, in combination with the strap, a position of the platform body, specifically a second body end of the platform body, is disposed above the upper surface of the seat portion of the passenger seat. In the platform installation position, though, the front leg support 114 may be operably configured to be disposed and/or locked at a substantially orthogonal orientation with respect to the platform body 102. This operational position supports the platform body 102 above the surface of the seat portion 126.

In some embodiments, a Step 918 may include decoupling the strap from the back portion of the seat. This Step 918 is performed when the assembly 100 is not needed. The strap 112 can hingedly be rotated parallel with the platform body 102. A final Step 920 includes rotating the front leg support parallel to the platform body. The front leg support 114 may be operably configured to have angular movement range α, of approximately 120° with respect to the lower surface 106 of the platform body 102. The front leg support 114 may have a plurality of leg support sections 130a, 130b telescopically coupled and lockable together to beneficially accommodate various passenger seats and/or other vehicle dimensions.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An adjustable vehicle pet platform assembly comprising:
   a platform body having an upper surface, a lower surface opposing the upper surface, a first body end, a second body end opposing the first body end, and a perimeter defining an arcuate chamfer disposed proximal to the first body end, the arcuate chamfer shaped and sized to receive a seat belt therein;
   a rear leg support spanning along and disposed proximal to the first body end and coupled to the lower surface of the platform body;
   a front leg support disposed proximal to the second body end, rotatably coupled to the lower surface of the platform body and having a distal free end with a lower support surface, the front leg support comprising a plurality of leg support sections telescopically coupled together; and
   a platform installation position along a platform installation path, the platform installation position including:

the rear leg support disposed at a joint between a back portion of a passenger seat of a vehicle and a seat portion of the passenger seat of the vehicle;

the lower support surface of the distal free end directly coupled to a floor surface of the vehicle, and the entirety of the lower and upper surfaces of the platform body disposed above an upper surface of the seat portion of the passenger seat of the vehicle.

2. The vehicle pet platform assembly according to claim 1, wherein the platform body further comprises:
a plurality of body sections telescopically coupled together, each of the plurality of body sections defining the upper surface of the platform body.

3. The vehicle pet platform assembly according to claim 2, wherein:
the plurality of body sections are operably configured to lockably couple with one another.

4. The vehicle pet platform assembly according to claim 1, wherein:
the perimeter comprises an oval-shaped plastic frame.

5. The vehicle pet platform assembly according to claim 1, wherein:
the upper surface of the platform body is substantially planar.

6. The vehicle pet platform assembly according to claim 1, wherein the upper surface of the platform body further comprises:
a non-slip padding.

7. The vehicle pet platform assembly according to claim 1, further comprising:
a strap coupled proximal to the first body end of the platform body, wherein the strap includes a length that is adjustable.

8. The vehicle pet platform assembly according to claim 7, wherein:
the strap is hingedly coupled to the to the first body end of the platform body.

9. The vehicle pet platform assembly according to claim 7, wherein:
the strap comprises a clasp for enabling length adjustment.

10. The vehicle pet platform assembly according to claim 1, wherein:
the front leg support comprises a flat panel.

11. The vehicle pet platform assembly according to claim 1, wherein the front leg support further comprises:
a first hinge disposed between a proximal end of the front leg support and the lower surface of the platform body.

12. The vehicle pet platform assembly according to claim 1, wherein:
the plurality of front leg support sections are defined by a slidable relationship.

13. The vehicle pet platform assembly according to claim 1, wherein:
the plurality of front leg support sections comprises two sections.

14. The vehicle pet platform assembly according to claim 1, wherein:
the rear leg support continually spans along the first body end of the platform body.

15. The vehicle pet platform assembly according to claim 14, wherein the rear leg support further comprises:
a second hinge disposed between the rear leg support and the platform body, the hinge enabling the rear leg support to rotate at an angular movement range between 0° and 90° relative to the platform body.

16. An adjustable vehicle pet platform assembly comprising:
a platform body having an upper surface that is substantially planar, a lower surface opposing the upper surface, a first body end, and a second body end opposing the first body end;

a rear leg support spanning along and disposed proximal to the first body end and coupled to the lower surface of the platform body;

a front leg support disposed proximal to the second body end, rotatably coupled to the lower surface of the platform body and having a distal free end with a lower support surface, the front leg support comprising a plurality of leg support sections telescopically coupled together; and a platform installation position along a platform installation path, the platform installation position including:
the rear leg support disposed at a joint between a back portion of a passenger seat of a vehicle and a seat portion of the passenger seat of the vehicle;

the lower support surface of the distal free end directly coupled to a floor surface of the vehicle, and the entirety of the lower and upper surfaces of the platform body disposed above an upper surface of the seat portion of the passenger seat of the vehicle.

17. An adjustable vehicle pet platform assembly comprising:
a platform body having an upper surface having a non-slip padding disposed thereon, a lower surface opposing the upper surface, a first body end, and a second body end opposing the first body end;

a rear leg support spanning along and disposed proximal to the first body end and coupled to the lower surface of the platform body;

a front leg support disposed proximal to the second body end, rotatably coupled to the lower surface of the platform body and having a distal free end with a lower support surface, the front leg support comprising a plurality of leg support sections telescopically coupled together; and a platform installation position along a platform installation path, the platform installation position including:
the rear leg support disposed at a joint between a back portion of a passenger seat of a vehicle and a seat portion of the passenger seat of the vehicle;

the lower support surface of the distal free end directly coupled to a floor surface of the vehicle, and the entirety of the lower and upper surfaces of the platform body disposed above an upper surface of the seat portion of the passenger seat of the vehicle.

18. An adjustable vehicle pet platform assembly comprising:
a platform body having an upper surface, a lower surface opposing the upper surface, a first body end, and a second body end opposing the first body end;

a rear leg support spanning along and disposed proximal to the first body end and coupled to the lower surface of the platform body;

a front leg support disposed proximal to the second body end, rotatably coupled to the lower surface of the platform body and having a distal free end with a lower support surface, the front leg support comprising a flat panel and a plurality of leg support sections telescopically coupled together; and a platform installation position along a platform installation path, the platform installation position including:

the rear leg support disposed at a joint between a back portion of a passenger seat of a vehicle and a seat portion of the passenger seat of the vehicle;

the lower support surface of the distal free end directly coupled to a floor surface of the vehicle, and the entirety of the lower and upper surfaces of the platform body disposed above an upper surface of the seat portion of the passenger seat of the vehicle.

19. An adjustable vehicle pet platform assembly comprising:

a platform body having an upper surface, a lower surface opposing the upper surface, a first body end, and a second body end opposing the first body end;

a rear leg support spanning continually along and disposed proximal to the first body end and coupled to the lower surface of the platform body;

a front leg support disposed proximal to the second body end, rotatably coupled to the lower surface of the platform body and having a distal free end with a lower support surface, the front leg support comprising a plurality of leg support sections telescopically coupled together; and a platform installation position along a platform installation path, the platform installation position including:

the rear leg support disposed at a joint between a back portion of a passenger seat of a vehicle and a seat portion of the passenger seat of the vehicle;

the lower support surface of the distal free end directly coupled to a floor surface of the vehicle, and the entirety of the lower and upper surfaces of the platform body disposed above an upper surface of the seat portion of the passenger seat of the vehicle.

\* \* \* \* \*